(12) United States Patent
Coffin et al.

(10) Patent No.: US 8,104,253 B2
(45) Date of Patent: Jan. 31, 2012

(54) GANG REEL MOWER WITH DIFFERING FRONT AND REAR REEL CUTTING UNIT SETUP FOR IMPROVING AFTERCUT APPEARANCE

(75) Inventors: Scott M. Coffin, Plymouth, MN (US); Ivan E. Brown, Castle Rock, CO (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/751,513

(22) Filed: Mar. 31, 2010

(65) Prior Publication Data
US 2011/0239603 A1    Oct. 6, 2011

(51) Int. Cl.
*A01D 75/30*    (2006.01)
(52) U.S. Cl. ............................................................. 56/7
(58) Field of Classification Search ................... 56/7, 6, 56/249, 294, 13.6
See application file for complete search history.

(56) References Cited

U.S. PATENT DOCUMENTS

| | | | | |
|---|---|---|---|---|
| 4,841,717 A | * | 6/1989 | Lloyd | 56/256 |
| 5,511,365 A | * | 4/1996 | Rice | 56/7 |
| 5,623,817 A | * | 4/1997 | Bricko et al. | 56/7 |
| 5,628,169 A | * | 5/1997 | Stiller et al. | 56/7 |
| 5,634,325 A | * | 6/1997 | Thorman et al. | 56/7 |
| 5,950,409 A | * | 9/1999 | Davies | 56/249 |
| 6,052,973 A | * | 4/2000 | Tsuchihashi et al. | 56/7 |
| 6,082,086 A | * | 7/2000 | Togoshi et al. | 56/199 |
| 6,131,379 A | * | 10/2000 | Ehn, Jr. | 56/15.7 |
| 6,336,312 B1 | * | 1/2002 | Bednar et al. | 56/6 |
| 6,588,191 B2 | | 7/2003 | Berndt et al. | |
| 6,732,500 B1 | * | 5/2004 | Myers | 56/17.2 |
| 7,581,374 B1 | * | 9/2009 | Coffin | 56/249 |
| 7,637,090 B2 | * | 12/2009 | Rinholm et al. | 56/249 |
| 2003/0145570 A1 | * | 8/2003 | Berndt et al. | 56/6 |
| 2008/0127619 A1 | * | 6/2008 | Link | 56/6 |

OTHER PUBLICATIONS

Toro Reelmaster 5010 Series Brochure, 2006. (Note picture and caption at bottom right corner of p. 4 relating to aftercut appearance.).
Toro Model No. 03661 Cutting Unit Operator's Manual, 2006. (Note pp. 10 and 11 relating to aggressiveness of cut adjustment.).
TurfNet Monthly, May 2008, pp. 12 -15. (Note turf compensation spring picture and discussion in last column of p. 12, and aftercut appearance discussion at last paragraph, col. 1 of p. 14 through first paragraph, col. 2 of p. 14 and in box at top of p. 14.).

* cited by examiner

*Primary Examiner* — Arpad Fabian-Kovacs
(74) *Attorney, Agent, or Firm* — James W. Miller

(57) ABSTRACT

A gang reel mower comprises a plurality of laterally spaced front reel cutting units having gaps therebetween, each gap being covered by a rear reel cutting unit that spans and overlaps the gap on each side thereof by an overlap area. Each of the front cutting units is supported for rolling on the ground by a grooved front roller having a grooved portion and by a substantially smooth rear roller having a substantially smooth rolling surface that each extend substantially across the entire width of cut of the front cutting unit. Each of the rear cutting units has a grooved front roller with side shoulders on each end and with a grooved portion between the side shoulders such that the shoulders extend substantially over the overlap areas between the front and rear cutting units with the grooved portion on the front roller of the rear cutting units not extending substantially into the overlap areas. In addition, each of the rear cutting units includes a rear roller with a rolling surface is shorter than the rear roller on the front cutting unit such that the shorter rolling surface does not extend substantially into the overlap areas.

5 Claims, 2 Drawing Sheets

GANG REEL MOWER WITH DIFFERING FRONT AND REAR REEL CUTTING UNIT SETUP FOR IMPROVING AFTERCUT APPEARANCE

TECHNICAL FIELD

This invention relates to gang reel mowers for cutting grass on turf surfaces.

BACKGROUND OF THE INVENTION

Riding gang reel mowers are known which comprise a self propelled traction frame that carries a seated operator who drives and guides the mower over a large turf surface that is to be mowed. Multiple reel cutting units are attached to the traction frame in a gang configuration for precision mowing of the grass on such a turf surface. In a typical gang configuration, the reel cutting units are disposed in a pair of rows with the cutting units in a first row being laterally spaced from one another. The cutting units in the second row would also be laterally spaced from one another, but would also be staggered and overlapped relative to the cutting units in the first row to cover and extend somewhat beyond the lateral gaps or spaces between the cutting units in the first row. This allows the reel mower to mow a relatively large and unbroken swath of grass in one pass of the reel mower over the turf surface. The Reelmaster 5010 Series mowers manufactured and sold by The Toro Company, the assignee of this invention, such as Toro's Reelmaster 5210 or 5410 mowers, are typical of such a riding gang reel mower.

Reel cutting units used on gang mowers customarily comprise a cutting unit frame having a pair of spaced side plates that are joined together by various cross members, such as a top wall and a back wall. A rotatable reel is located between the side plates and rotates about a horizontal axis to sweep uncut grass against a sharpened bedknife to cut the grass by shearing the grass between the blades of the reel and the bedknife. The reel cutting unit is typically supported for rolling on the ground as it cuts grass by long front and rear rollers that are rotatably journalled between the side plates of the cutting unit frame. The front roller is often grooved across its length such that it contacts the ground only at separated points of contact formed by the laterally spaced annular ribs that define the grooves on the roller. Such a grooved front roller is sometimes referred to as a Wiehle roller in the mowing art. The rear roller is usually provided with a smooth, solid outer surface along its length such that it contacts the ground substantially along its entire length.

In gang reel mowers of the type under consideration here, the grass in the turf surface is cut twice in the overlap areas between the front and rear cutting units and only once in the rest of the swath. In some turf conditions, this "double cut" in the overlap areas visually shows up in the cut grass in the swath as streaks of grass having a different color, usually a lighter color, than the grass in the rest of the swath. Such streaks are caused by a lower height of cut and/or damage to the grass leaf due to double cutting.

When this occurs, an observer usually sees as many streaks as there are overlap areas between the front and rear cutting units. In a typical fiveplex 3-2 gang configuration of cutting units arranged in a row of three front cutting units followed by two rear cutting units, there are four overlap areas. Thus, if the turf conditions are conducive for showing double cut marks, four usually lighter color streaks will be present within the cut grass swath along the overlap areas where the grass has been cut twice, first by the front cutting units and then by the overlapped portions of the rear cutting units.

These double cut marks or streaks can be objectionable to some operators of reel gang mowers to whom the aftercut appearance of the turf surface is particularly important. For example, owners of golf courses, particularly prestigious golf courses that host professional golf tournaments, desire that the cut grass swath provided by a mower in a single pass be as uniform in appearance from side to side as possible. In other words, such customers do not want to see streaks or marks of any type within the lateral width of the cut grass swath. At the very least, such customers want such streaks or marks to fade as quickly as possible.

One procedure known in the mowing art to eliminate or minimize double cut marks left by the overlapped reel cutting units in a gang reel mower is to change the type of grooved roller that is used as the front roller on the cutting units. Normally, as described earlier, the grooved front roller on a reel cutting unit is grooved across substantially its entire length, including being grooved in the overlap areas. If the turf conditions are conducive for showing double cut marks in the cut grass swath, this normal grooved roller has in the past been replaced with a grooved roller in which the outermost grooves on either end of the roller have been filled in or replaced by a side shoulder provided at either end of the roller in the overlap area. The side shoulders of such known grooved rollers have typically had the same outer diameter (OD) as the OD of the normal grooved roller (i.e. 3") without shoulders. However, the OD of the remaining grooved portion of this roller has typically been slightly reduced (i.e. 2.9") so that the shoulders have a slightly larger 3" OD than the 2.9" OD of the grooved portion of the roller extending between the shoulders. Such grooved rollers with side shoulders are then used as the front roller on each of the reel cutting units in the gang configuration, i.e. namely on all of the front cutting units and on all of the rear cutting units.

The solution described above can help minimize double cut marks since the use of shoulders on the front rollers of the cutting units in the overlap areas makes the cut less aggressive in the overlap areas, thus compensating somewhat for the fact that the grass is cut twice in such areas rather than once. However, the Applicants have discovered that the side shoulders on the laterally outermost sides of the front rollers of the two left and right front cutting units in the 3-2 gang configuration described above also make the cut less aggressive in strips along the extreme side edges of the cut grass swath. Thus, the Applicants have discovered that the solution previously used for helping minimize double cut marks leads to a new problem in the appearance of the cut grass swath. While it is true that the four double cut streaks in the interior of the cut grass swath may now be gone or greatly diminished, there are two new streaks or marks along each side of the cut grass swath where the grass has been cut less aggressively by the left and right front cutting units than in areas immediately to the inside thereof.

A similar problem to the double cut marks left in the interior of the cut grass swath is that of "double roll" marks that can also occur in the overlap areas between the front and rear reel cutting units due to the action of the substantially smooth rolling surfaces of the rear rollers on the front and rear cutting units. Double roll marks are streaks or marks having a different appearance than the rest of the cut grass swath and they may be lighter or darker than the rest of the cut grass swath depending on the grass type and turf conditions. In the 3-2 gang configuration described above, the solid rear rollers of the front and rear cutting units have rolling surfaces that also overlap with one another. Thus, the grass that is cut by these cutting units is rolled twice by the rear rollers in the overlap areas, first by one end of the rear roller of any given front cutting unit and then by the overlapped end of the rear roller of the trailing rear cutting unit. This double rolling in the overlap areas differs from the rest of the cut grass swath where the grass is rolled only once by a rear roller, thereby giving rise to a difference in appearance in the overlap areas.

A prior solution known in the art to address the problem of double roll marks is to use a shorter rear roller on all front and rear cutting units of the gang reel mower. In fact, the rear roller so used is sufficiently short so that there are no overlap areas between the ends of the rear rollers. The ends of the shorter rear rollers in the interior of the cut grass swath now effectively laterally align with one another rather than laterally overlap one another. Thus, the rear rollers on the cutting units do not roll the grass twice any longer in the overlap areas but only once, thereby preventing or mitigating the appearance of double roll marks in the overlap areas between the front and rear cutting units.

Again, the Applicants have discovered that this known solution to double roll marks creates new problems. The Applicants have recognized that the front cutting units are placed out front on the traction frame ahead of the front drive wheels of the reel mower. The Applicants have further recognized that equipping such front cutting units with shorter rear rollers detracts from their ground following ability and makes the front cutting units less able to stably follow highly contoured and undulating terrain, even though the rear rollers on a mower where the rear cutting units overlap the front cutting units by 2.5" on each side are only 5" shorter than before. Also, since the ends of the shorter rear roller on the front cutting units in this solution do not roll down the grass in the overlap areas; this grass tends to stands up taller and can be cut lower by the rear cutting units, thus leading to a worse double cut mark. Thus, front cutting units equipped with shorter rear rollers have been observed by the Applicants as having a decreased quality of cut compared to what they previously provided with longer rear rollers. Solving the double roll mark problem by equipping all the cutting units of a gang reel mower with shorter rear rollers thus gives rise to these new problems.

In addition, the Applicants have further recognized that the use of shorter rear rollers on all the cutting units of a gang reel mower further means that the extreme side edges of the cut grass swath are not rolled at all by any rear roller. Thus, as was the case when the prior art known solution to the problem of double cut marks was adopted, the grass along the sides edges of the swath is treated differently from the rest of the swath—it is not rolled even once. Thus, the known solution to double roll marks, while perhaps effective in removing double roll marks from the interior of the swath, is to cause a difference in appearance along the extreme side edges of the swath. This is a new disadvantage since it detracts from what many customers desire, namely a cut grass swath that has a uniform appearance all the way from one side edge to the other.

SUMMARY OF THE INVENTION

A gang reel mower comprises a plurality of laterally spaced front reel cutting units having lateral gaps therebetween with each front reel cutting unit providing a width of cut. Each gap is covered by a rear reel cutting unit having a width of cut that spans the gap and that extends beyond opposite sides of the gap to also overlap by an overlap distance a portion of the width of cut of the spaced front cutting units that form the gap such that all the front and rear cutting units collectively cut an unbroken swath of grass during a single pass of the mower. Each of the front cutting units is supported for rolling on the ground by a grooved front roller having a grooved portion and by a rear roller having a substantially smooth rolling surface, wherein the grooved portion of the front roller of each front cutting unit extends substantially across at least the entire width of cut of the front cutting unit. Each of the rear cutting units is supported for rolling on the ground by a grooved front roller with side shoulders on each end thereof and by a rear roller having a smooth rolling surface, wherein the shoulders on the front roller of each rear cutting unit provide substantially continuous rolling surfaces that contact the ground and roll on the turf to extend laterally at least substantially entirely across the overlap distances of the overlaps such that the grooved portion of the front roller is located substantially entirely between the overlaps to thereby minimize double cut marks in the overlaps.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
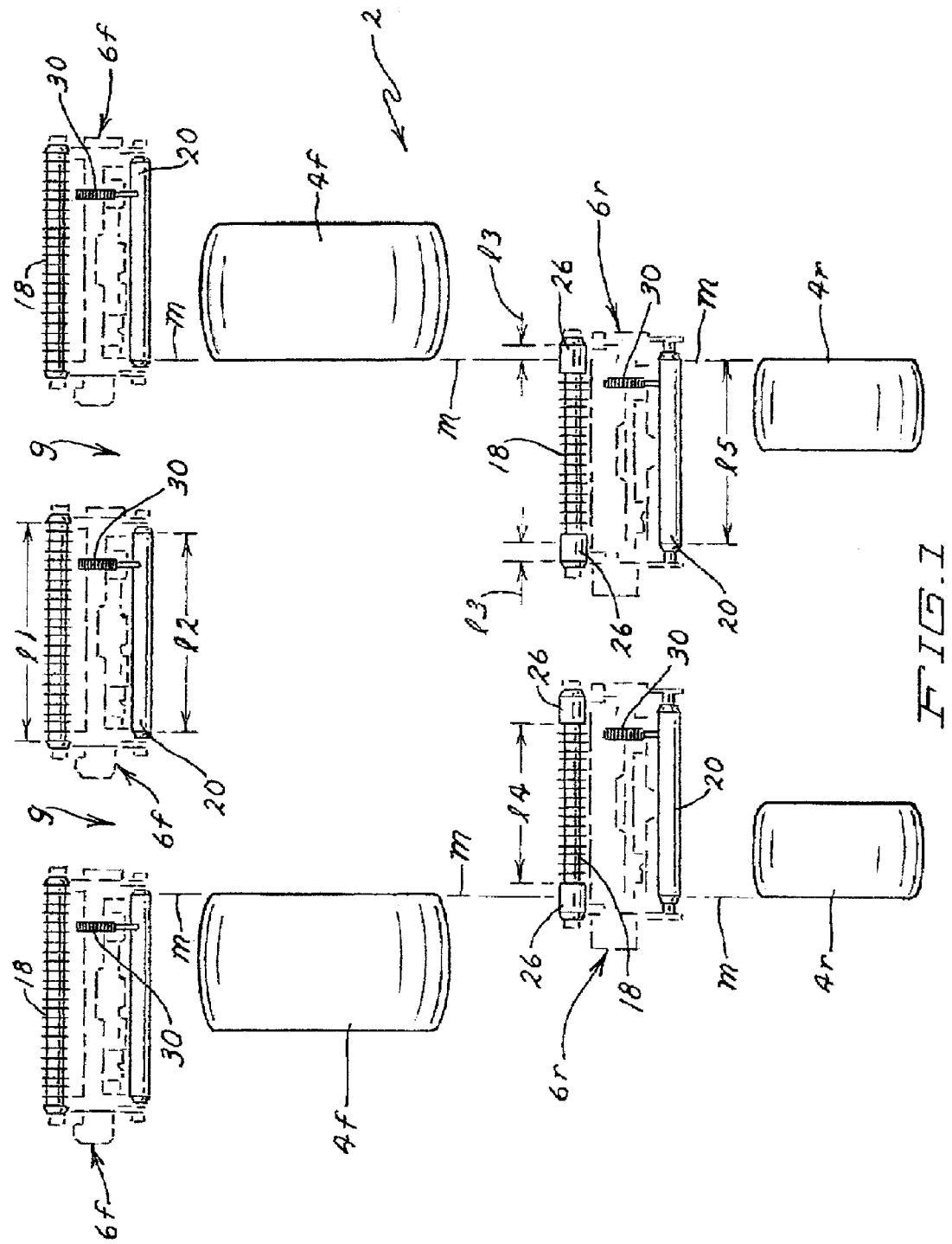
FIG. 1 is a top plan schematic view of a gang reel mower according to this invention, particularly illustrating the front and rear reel cutting units of the reel mower and their spatial relationship to one another and to the ground engaging wheels of the reel mower.

Referring first to FIG. 1, one embodiment of a reel mower according to this invention is illustrated generally as 2. Reel mower 2 depicted in FIG. 1 is shown only partially and in schematic form only to the extent needed to illustrate the invention. For example, the only portions of the traction frame of reel mower 2 that are shown are the four ground engaging wheels 4 of reel mower 2, namely the front drive wheels 4*f* and the rear steerable wheels 4*r*. The only other portions of reel mower 2 that are shown are the various reel cutting units 6 that are suitably attached to the traction frame of reel mower 2. Reel mower 2 as depicted herein can be a Reelmaster Series 5010 reel mower manufactured and sold by The Toro Company, the assignee of this invention, which reel mower is well known in the mowing art.

Figure 2:
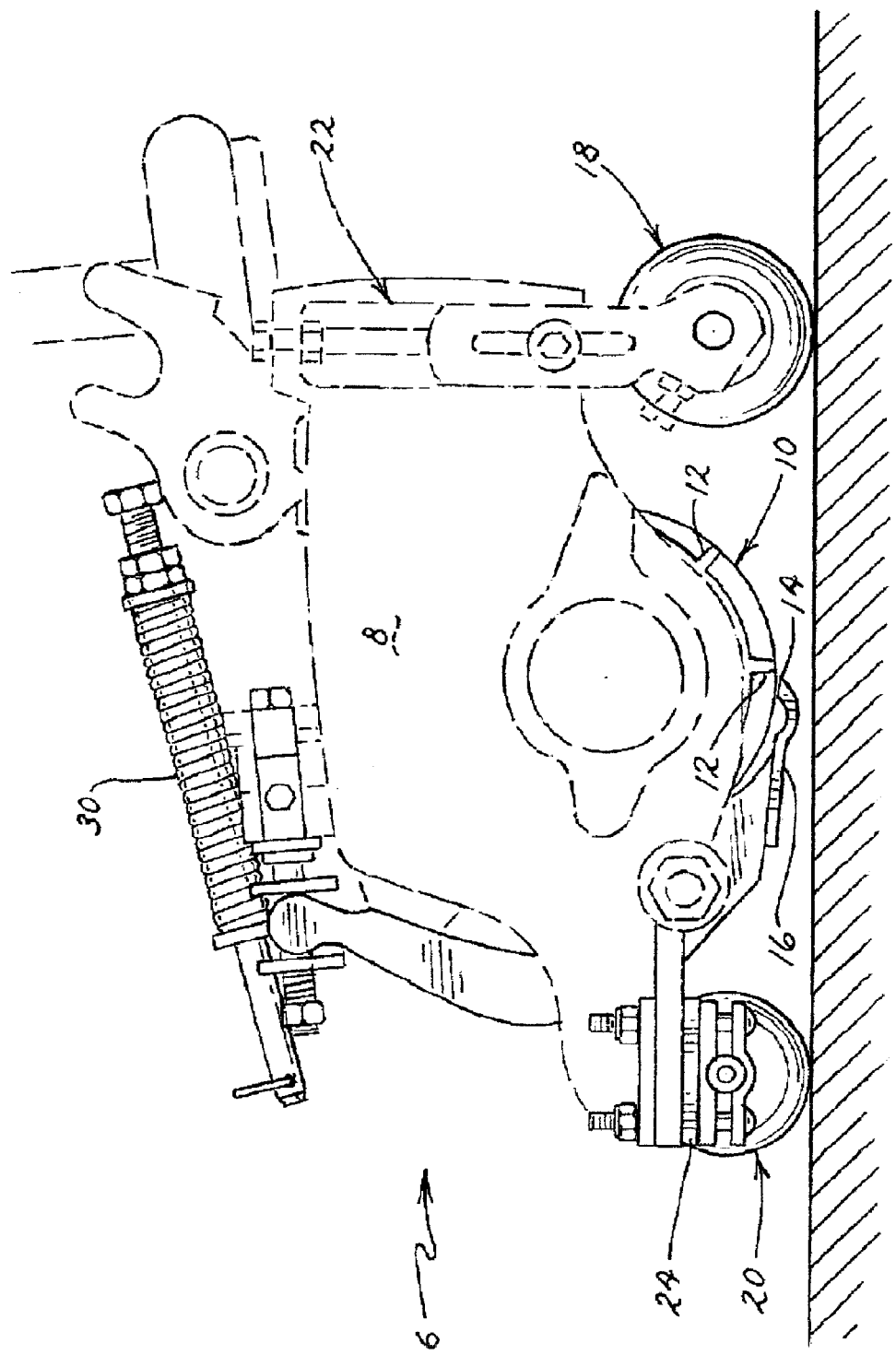
FIG. 2 is a side elevational view of a reel cutting unit of the type used on the reel mower of FIG. 1.

By way of additional background, reference can be had to FIG. 2 which depicts one form of reel cutting unit 6 that can be used on reel mower 2. Cutting unit 6 comprises a cutting unit frame having, in part, a pair of laterally spaced side plates 8 (one of which is shown in FIG. 2) that rotatably journal a reel 10 extending between side plates 8. Reel 10 has a plurality of helical blades 12 which sweep uncut stalks of grass against a sharpened front edge 14 of a bedknife 16 that also extends between side plates 8. Bedknife 16 is adjacent a lower portion of the orbit of reel 10 such that rotation of reel 10 pushes the uncut stalks of grass against sharpened front edge 14 of bedknife 16 to cut them by shearing them off against bedknife 16.

Cutting unit 6 is supported for rolling over the ground during movement of reel mower 2 over the ground by its own rotatable front roller 18 and rotatable rear roller 20. The precise configurations of rollers 18 and 20 on different cutting units 6 will be discussed hereafter as part of this invention.

Cutting unit 6 adjusts the height of cut by moving front and rear rollers 18 and 20 up and down relative to side plates 8.

The higher the rollers relative to side plates 8, the lower the height of cut, and vise versa. Threaded adjusters 22 are used at each end of front roller 18 to move front roller 18 up and down in an infinite manner. Rear roller 20 has its height adjusted by placing a selected number of shims 24 between opposite ends of rear roller 20 and side plates 8 of the frame of cutting unit 6. Thus, a particular height of cut is provided by rotating threaded adjusters 22 on front roller 18 to a particular height of cut setting on a gauge bar and by then placing the nominally correct number of shims 24 between side plates 8 and the ends of the shaft of rear roller 20. For example, a height of cut of 0.375" as set by the gauge bar would nominally require 1 shim while a height of cut of 0.750" on the gauge bar would nominally require 3 shims. Different ways of adjusting the height of cut could also be used.

Cutting units 6 are arranged on reel mower 2 in a 3-2 gang configuration, namely three front cutting units 6f arranged ahead of front wheels 4f of reel mower 2 followed by a pair of rear cutting units 6r arranged between the front and rear wheels 4f and 4r of reel mower 2. The three front cutting units 6f comprise left, center and right front cutting units that are laterally spaced apart from one another to have a pair of gaps g therebetween. The two rear cutting units 6r are laterally staggered relative to front cutting units 6f to cover gaps g between front cutting units 6f so that all five cutting units 6 cut a single, unbroken swath of grass during a single pass of reel mower 2.

In fact, rear cutting units 6r overlap front cutting units 6f to try and ensure that no uncut strips of grass are left in the interior of the cut grass swath even during turns of reel mower 2. All cutting units 6 preferably have an identical width of cut, e.g. 22". The cutting width of the two rear cutting units 6r are overlapped 2.5" on each side thereof relative to the cutting width of the front cutting units 6f, as indicated by the overlap distance 13 in FIG. 1. Thus, the five 22" cutting units 6 shown herein provide a total cut grass swath that is 100" wide when the total of 10" of overlap provided by the left and right sides of rear cutting units 6r is deducted ((22*5)−(2.5*4)=100). The 22" width of cut and the 2.5" overlap is just an example and both may vary on different mowers 2, namely the width of cut on cutting units 6 could be larger or smaller and the amount of overlap could be larger or smaller.

In this invention, rollers 18 and 20 of front cutting units 6f are setup in a normal manner as they would usually be setup without any attempt to solve the problems of "double cut" marks or "double roll" marks. In other words, front roller 18 on each front cutting unit 6f is a grooved Wiehle type roller in which the grooved portion of roller 18 has a length 11 that extends substantially across the entire cutting width of front cutting unit 6f. For example, when each cutting unit 6 has a 22" cutting width provided by a reel that cooperates with a 22" long bedknife, the length 11 of the grooved portion of front roller 18 is also substantially at least 22" long to provide a quality of cut that is consistent across the entire width of front cutting unit 6f. Similarly, rear roller 20 on each front cutting unit 6f is a smooth, solid roller providing a substantially smooth rolling surface that has a length 12 that also extends substantially across the entire cutting width of front cutting unit 6f. In the 22" cutting width example set forth above, the length 12 of the rolling surface of rear roller 20 is also substantially at least 22" long to provide uniform rolling of the grass that has just been cut by a particular front cutting unit.

However, contrary to conventional wisdom in the art of reel mowers in which the front and rear cutting units in a gang configuration have always been identically configured and setup, rollers 18 and 20 on rear cutting units 6r are configured and setup differently from rollers 18 and 20 on front cutting units 6f. As shown in FIG. 1, each front roller 18 on each rear cutting unit 6r has a side shoulder 26 on each side thereof with the grooved portion of front roller 18 being between shoulders 26 on front roller 18. Specifically, each shoulder 26 has a length that is at least substantially equal to and may be slightly more than the amount 13 of overlap between the front and rear cutting units. Again, taking the specific 22" cutting width example above in which there is a 2.5" overlap, the length of the shoulder is at least substantially 2.5" such that the length 14 of the grooved portion of front roller 18 on rear cutting unit 6r now becomes 17" or less depending on the precise length of shoulder 26. In addition, shoulder 26 is positioned to substantially overlie the overlap such that it extends substantially at least entirely across the overlap distance 13 with the outer surface of the shoulder being configured to provide a substantially continuous rolling surface that contacts the ground and rolls on the turf substantially at least entirely across the overlap distance 13. This helps prevent double cut marks in the interior of the cut grass swath since the cutting aggressiveness of rear cutting units 6r in the overlap areas is reduced relative to the rest of the cut grass swath, thereby mitigating the tendency to leave streaks in the overlap areas due to double cutting.

Shoulders 26 can be provided on front rollers 18 in different ways. For example, each shoulder 26 can be an integrally formed part that is slipped around the end of the shaft of roller 18 outboard of each end of whatever structure that forms the grooved portion of roller 18, or shoulders 26 and the grooved portion of roller 18 could be integrally formed together as a one-piece cast roller body. Alternatively, shoulders 26 can be formed by annular inserts that are placed into the outermost grooves on each end of the grooved portion of a standard Wiehle roller 18 to fill in such outermost grooves. This latter method of forming shoulders 26 is disclosed in U.S. Pat. No. 6,588,191, owned by The Toro Company, the assignee of this invention, which patent is hereby incorporated by reference.

Similarly, a shorter rear roller 20 is used on each rear cutting unit 6r compared to the length of rear roller 20 used on each front cutting unit 6f. More specifically, each rear cutting unit 6r uses a rear roller 20 that has been shortened on each side by substantially the amount of the overlap. Again, in the example set forth above, the length 15 of the cut grass rolling surface of rear roller 20 on each rear cutting unit is now substantially 17". Accordingly, the ends of the rolling surfaces on the shorter rear rollers 20 on a particular rear cutting unit 6r will substantially laterally align with the ends of rear rollers 20 on front cutting units 6f that border either side of the gap g being covered by rear cutting unit 6r, as shown by the alignment lines m placed on FIG. 1. This helps prevent double roll marks in the interior of the cut grass swath, even though rear rollers 20 on the front and rear cutting units 6f and 6r are not the same in this invention.

This invention helps solve the problems of double cut and double roll marks in the cut grass swath without simultaneously creating other problems in the appearance of the cut grass swath in other areas outside of the overlap areas and without degrading the overall quality of cut. Notably, front cutting units 6f are unchanged from their usual state along the extreme side edges of the cut grass swath. That is, each of the left and right front cutting units 6f have the usual front grooved Wiehle roller and solid rear roller that extend all the way to the very edge of the swath, to the laterally outermost edge of the 22" cutting width of the left or right front cutting unit. Thus, the cutting effectiveness along this outside edge is the same as in the interior of the swath and the cut grass along this outside edge is still being rolled once as in the rest of the swath. This promotes the desirable advantage of uniformity in appearance in the swath from one side of the swath all the way to the other side.

Moreover, front cutting units 6f still retain the usual long rear roller 20 thereon which helps such front cutting units 6f stably follow changing terrain. Rear cutting units 6r can effectively use a shorter rear roller 20 to solve the double roll problem without being as affected by the ground following disadvantages of using a shorter rear roller since the Applicants have discovered that rear cutting units 6r do not need the same ground following ability as front cutting units 6f due to their placement between the front and rear wheels 4f and 4r of reel mower 2. For example, when reel mower 2 approaches a hill and front cutting units 6f first contact the hill, they have to change orientation quickly relative to the traction frame as the front wheels 4f on the traction frame have not yet reached the hill. However, when rear cutting units 6r reach the same hill, front wheels 4f of the traction frame are already on the hill and the traction frame is already climbing the hill. The Applicants have discovered in this instance that rear cutting units 6r can get by with using a shorter rear roller while front cutting units 6f desirably retain the use of the normal longer rear roller.

Finally, cutting units 6 disclosed herein each have a turf compensation spring 30 that is per se known in the mowing art. The compression of spring 30 can be changed or adjusted to change the front to rear weight bias of a particular cutting unit 6. When spring 30 is compressed or shortened, the effect is to transfer more weight from front roller 18 to rear roller 20 of cutting unit 6 than the weight placed on rear roller 20 at more uncompressed or longer settings of spring 30. Usually, springs 30 are set to counteract any bobbing of cutting units 6 that might occur as reel mower 2 is driven oven the ground. Such bobbing evidences itself in the cut grass swath by a wavy grass pattern caused by different heights of cut resulting from the bobbing.

As a result of using a different roller setup on the front and rear cutting units as described above, the Applicants have discovered that rear cutting units 6r have less grass support than front cutting units 6f (5" out of 22" or 23% less) because the grass in the overlap areas has already been cut by front cutting units 6f. Because the grass is shorter in the overlap areas for rear cutting units 6r, such cutting units 6r have a tendency to rest lower in the grass and thus cut the grass shorter across the entire width of the reel. In some turf conditions, this may be reflected in a color difference in the appearance of the cut grass in those areas of the swath that were cut by rear cutting units 6r.

If this should occur and in keeping with the objective of making the cut grass swath as uniform in appearance as possible from one side to the other, springs 30 on rear cutting units 6r can be shortened somewhat (e.g. by an additional quarter inch or so) compared to the settings of springs 30 on front cutting units 6f. This transfers additional weight from front roller 18 to rear roller 20 to make the cut of rear cutting units 6r less aggressive. This allows rear cutting units 6r to provide an effective height of cut that is much closer to or substantially equal to the height of cut provided by front cutting units 6f, thus further promoting uniformity in the aftercut appearance of the cut grass swath. However, in many types of grasses and depending on turf conditions, this further adjustment in springs 30 for rear cutting units 6r may not be needed.

Various modifications of this invention will be apparent to those skilled in the art. The embodiment of the invention disclosed herein is for illustrative purposes only and is not intended to limit the invention. Thus, the scope of this invention will be limited only by the appended claims.

The invention claimed is:

1. A gang reel mower, which comprises:
   (a) a plurality of laterally spaced front reel cutting units having lateral gaps therebetween with each front reel cutting unit providing a width of cut, each gap being covered by a rear reel cutting unit having a width of cut that spans the gap and that extends beyond opposite sides of the gap to also overlap by an overlap distance a portion of the width of cut of the spaced front cutting units that form the gap such that all the front and rear cutting units collectively cut an unbroken swath of grass during a single pass of the mower;
   (b) wherein each of the front cutting units is supported for rolling on the ground by a grooved front roller having a grooved portion and by a rear roller having a substantially smooth rolling surface, wherein the grooved portion of the front roller of each front cutting unit extends substantially across at least the entire width of cut of the front cutting unit; and
   (c) wherein each of the rear cutting units is supported for rolling on the ground by a grooved front roller with side shoulders on each end thereof and by a rear roller having a substantially smooth rolling surface, wherein the shoulders on the front roller of each rear cutting unit provide substantially continuous rolling surfaces that contact the ground and roll on the turf to extend laterally at least substantially entirely across the overlap distances of the overlaps such that the grooved portion of the front roller of each rear cutting unit is located substantially entirely between the overlaps to thereby minimize double cut marks in the overlaps.

2. The gang reel mower of claim 1, wherein the cutting width of the front cutting units and the cutting width of the rear cutting units are the same.

3. The gang reel mower of claim 1, wherein the reel mower has a plurality of ground engaging front and rear wheels, wherein the front cutting units are located ahead of the front wheels and the rear cutting units are located between the front and rear wheels.

4. The gang reel mower of claim 3, wherein each cutting unit has a turf compensation spring that can be adjusted to transfer more or less weight from the front roller of the cutting unit to the rear roller, wherein the turf compensation springs for the front cutting units are set to provide a first distribution of the weight of the front cutting units on the front and rear rollers of the front cutting units, and wherein the turf compensation springs for the rear cutting units are set to provide a second distribution of the weight of the rear cutting units on the front and rear rollers of the rear cutting units, and wherein the second distribution of weight provides less weight on the front rollers of the rear cutting units and more weight on the rear rollers of the rear cutting units than that provided by the first distribution on the front and rear rollers of the front cutting units.

5. The gang reel mower of claim 1, wherein the substantially smooth rolling surface of the rear roller of each front cutting unit extends substantially across at least the entire width of cut of the front cutting unit, and wherein the rolling surface on the rear roller of each rear cutting unit is shorter than the rolling surface on the rear roller of each front cutting unit and does not extend substantially across any portion of the overlap distances of the overlaps to further avoid double roll marks in the overlaps.

* * * * *